(12) United States Patent
Walmsley et al.

(10) Patent No.: US 6,196,682 B1
(45) Date of Patent: Mar. 6, 2001

(54) CLIP-ON EYEWEAR WITH BIASED TEMPLE ARMS

(76) Inventors: Steven Benjamin Walmsley, 7256 Green Farm Rd., West Bloomfield, MI (US) 48322; Nelson David Bove, 4560 Walton Creek, Cincinatti, OH (US) 45243

( * ) Notice: Subject to any disclaimer, the term of this patent is extended or adjusted under 35 U.S.C. 154(b) by 0 days.

(21) Appl. No.: 09/399,850

(22) Filed: Sep. 21, 1999

(51) Int. Cl.$^7$ .................. G02C 5/16; G02C 5/22
(52) U.S. Cl. .................. 351/113; 351/121; 351/153; 16/228
(58) Field of Search .................. 351/111, 113, 351/114, 121, 153; 16/228

(56) References Cited

U.S. PATENT DOCUMENTS

| | | | |
|---|---|---|---|
| 1,599,843 | 9/1926 | Schumacher | 351/153 |
| 2,608,905 | * 9/1952 | Nelson | 351/114 |
| 3,586,425 | 6/1971 | Gilman | 351/113 |
| 3,606,525 | 9/1971 | Landree | 351/113 |
| 3,644,023 | 2/1972 | Villani | 351/113 |
| 3,899,840 | * 8/1975 | Maillet | 351/113 |
| 3,923,384 | 12/1975 | Leblanc | 351/113 |
| 4,050,785 | 9/1977 | Auge | 351/120 |
| 4,129,362 | 12/1978 | Lorenzo | 351/123 |
| 4,244,081 | 1/1981 | Beyer et al. | 351/153 |
| 4,618,226 | 10/1986 | Sartor et al. | 351/113 |
| 4,978,209 | 12/1990 | Ohba | 351/153 |
| 4,986,650 | 1/1991 | Wilhelmi | 351/153 |
| 4,991,258 | 2/1991 | Drlik | 351/153 |
| 5,035,499 | * 7/1991 | Kitamura et al. | 351/153 |
| 5,229,795 | 7/1993 | Heintzelman | 351/120 |
| 5,406,339 | 4/1995 | Chen | 351/153 |
| 5,631,719 | 5/1997 | Chao | 351/153 |
| 5,739,891 | 4/1998 | Wei | 351/113 |
| 5,745,209 | 4/1998 | Khantzis | 351/153 |

* cited by examiner

*Primary Examiner*—Huy Mai
(74) *Attorney, Agent, or Firm*—Vanophem Meehan & Vanophem, P.C.

(57) ABSTRACT

An eyewear assembly that is capable of biasing a temple arm tightly against a rim frame so as to pinch a storage surface therebetween for storage purposes. The eyewear assembly includes the rim frame having at least one pivot axis through the rim frame. The temple arm includes a pivot axis through the temple arm, with the pivot axis being coaxially disposed with the pivot axis of the rim frame. A device for clasping the temple arm and rim frame together in both an open and closed position is mounted proximate the pivot axes. The rim frame engages the temple arm to bias the temple arm against the rim frame—thereby establishing a predetermined load on the rim frame in the closed position. The device for clasping further includes a clasping feature located on the rim frame and a clasping feature located on the temple arm, with one of the clasping means including a detent and the other clasping feature including a pawl that engages the detent.

21 Claims, 4 Drawing Sheets

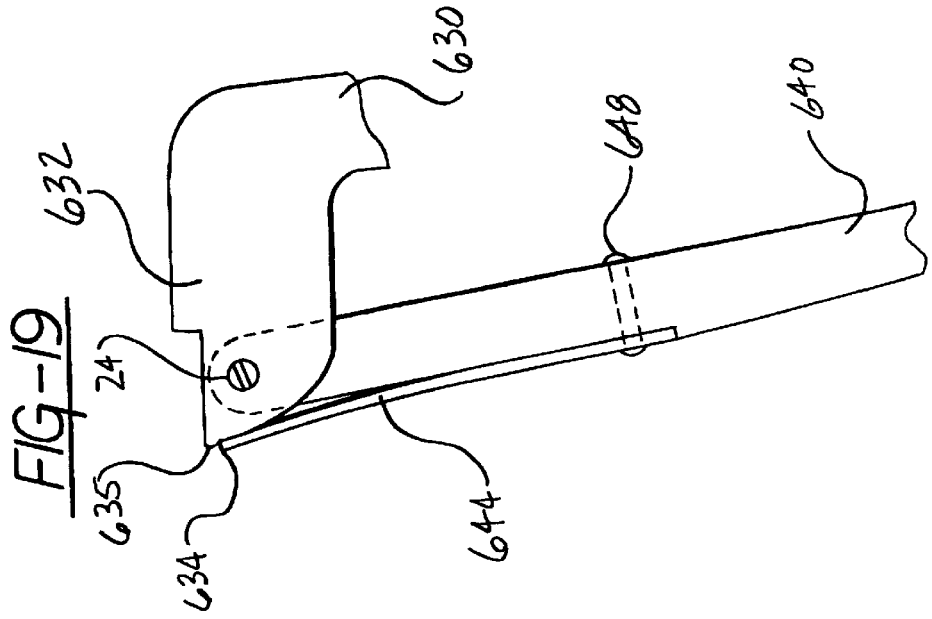
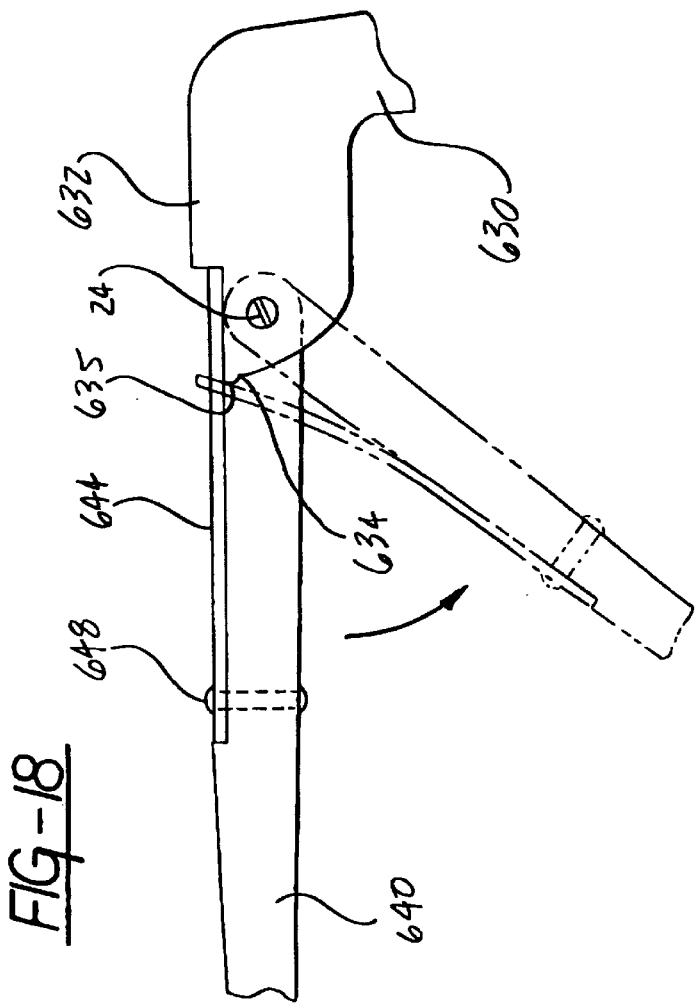

CLIP-ON EYEWEAR WITH BIASED TEMPLE ARMS

BACKGROUND OF THE INVENTION

1. Field of the Invention

The present invention generally relates to eyewear having a rim frame and a temple arm pivotably hinged to the rim frame. More particularly, the present invention relates to an eyewear assembly where the temple arm and rim frame can be firmly clasped together to bias the temple arm tightly against the rim frame in a closed position.

2. Description of the Prior Art

Eyewear typically includes a frame having two rims, each holding a lens, and further includes two temple arms, each on opposite lateral sides of the frame and attached by a respective hinge pin. The hinge pin enables the wearer to pivot the temple arms from an open position, as worn on the face, to a closed position against the frame for storing. Many people prefer to store their eyewear by hanging them over a storage surface such as a pocket or vee of a shirt, a pocket or belt loop on a pair of pants, or alternatively an automobile sun visor. For example, a wearer might remove the eyewear from their face, fold a first temple arm closed, then slip the end of a second temple arm into a shirt pocket and fold the frame closed over the pocket.

However, typical eyewear does not provide any feature to pinch the eyewear to the storage surface for reliable safekeeping. In fact, typical eyewear suspended on the storage surface inevitably will swing open and work loose from the storage surface, resulting in loss or severe damage to the eyewear. This is particularly problematic with modern eyeglass styles that are becoming increasingly delicate and expensive.

The solution to the problem would seem to be easy—simply tighten the hinge pin to achieve a stronger, tighter relationship between the second temple arm and the frame in the closed position. However, not only must the second temple arm be located in the closed position, but the temple arm must also be biased against the frame to create a pinching effect on the storage surface placed therebetween. Unfortunately, typical hinge pins loosen too quickly for this solution to be of any use. One inventor has recognized and attempted to solve the problem in Wei, U.S. Pat. No. 5,739,891.

Wei discloses a spring-loaded collar mounted coaxially with a temple. The collar abuts squarely to a rim lug surface on the frame that is normal to the axis of the temple. This configuration acts to hold the temple firmly to the frame in either the open or folded up positions. Unfortunately, this design has too many shortcomings. First, the mounting structure of Wei requires use of at least four more parts than are required for a typical temple arm mounting structure. Second, the required parts are not only numerous but also complicated in design and therefore relatively expensive to manufacture and assemble. Third, the large number of parts may make the eyeglasses noticeably heavier than typical eyeglasses. Fourth, the design is aesthetically unconventional and therefore may not appeal to many eyeglasses wearers. Finally, the mounting structure permits resting the temple arm in either the open position or the closed position, but not easily therebetween.

Schumacher, U.S. Pat. No. 1,599,843, addresses the problem of accidental displacement of a temple relative to an eyeglass frame. Schumacher discloses a leaf spring member anchored at one end inside a slot in the temple, where a free end jams against a metal insert doweled to a hinge area of the eyeglass frame. The jam condition enables the temple to lock firmly in the open or closed position. A longitudinal relief in the temple permits the spring member to be displaced just enough to unjam the spring member and pivot the temple. The Schumacher design is also impractical in that the hinge is aesthetically unconventional and uses far more parts than typical eyeglasses.

Ohba, U.S. Pat. No. 4,978,209, discloses a hinge for an eyeglass frame incorporating an elastic "C"-shaped wire member extending from an end of a temple member. The opposed ends of the "C"-shaped wire member define hinge shafts that fit into a bearing portion of an eyeglass frame. The bearing portion establishes the limits of pivotal travel of the temple member and includes two positions into which the "C"-shaped wire member mesh and are held relative to the eyeglass frame. While the Ohba design uses few parts, it also has several significant drawbacks. First, from an aesthetic design perspective the hinge is a drastic departure from typical styles, and is preferably applicable only to sunglasses and sport glasses. Second, the "C"-shaped wire member is unfortunately not integral with the temple arm and thus presents an assembly challenge. Third, the bearing surface is more complex than those of typical hinges and it may be difficult to reliably mold such a bearing surface.

Finally, two other references, U.S. Pat. No. 3,586,425 to Gilman, and U.S. Pat. No. 3,606,525 to Landree, disclose use of torsional coil springs to fold temple arms closed against a frame for a pair of spectacles. Both Gilman and Landree teach use of the coil springs to firmly engage the temple arms against the head of the wearer of the spectacles. Unfortunately, the coil springs are of sufficient size that they are not easily disguised. Therefore the spectacles are noticeably different in appearance than conventional eyewear, and may be a detriment when traditional styling is desired. In addition, the spring force must not be so strong as to cause pain to the wearer as the spectacles are worn on the head. Therefore, the spring force for urging the temples closed is likely to be relatively weak and insufficient for holding the spectacles closed in storage situations.

One key to reliably clipping eyewear to a storage surface is that the storage surface should be pinched tightly by the eyewear componentry so the eyewear will not slip off the storage surface. If the second temple member is not biased against the frame, then the eyewear will not clip tightly thereto. None of the above-mentioned references teaches or discloses eyewear in which a second temple member is biased tightly against the frame to pinch a storage surface tightly therebetween.

Accordingly, there is a continuing need for an eyewear assembly that is capable of biasing a temple arm tightly against the frame, to pinch a storage surface therebetween. Such an eyewear assembly would appear aesthetically conventional, would require few, if any, additional parts over a conventional pair of eyeglasses, and would be as easy to form and assemble as are a conventional pair of eyeglasses.

SUMMARY OF THE INVENTION

According to the present invention there is provided an eyewear assembly that is capable of biasing a temple arm tightly against a rim frame, so as to pinch a storage surface therebetween. Additionally there is provided an eyewear assembly that appears aesthetically conventional, requires comparatively few or no additional parts over a conventional pair of eyeglasses, and is as easy to form and assemble as a conventional pair of eyeglasses.

According to the present invention, an eyewear assembly includes a rim frame having a pivot axis through the rim frame. Also provided is a temple arm including a pivot axis through the temple arm, with the pivot axis of the temple arm being coaxially disposed with the pivot axis of the rim frame. Further provided are clasping features on the temple arm and rim frame that cooperate in both an open and/or closed position. The clasping features are mounted proximate the pivot axes, such that the rim frame engages the temple arm to bias the temple arm against the rim frame— thereby establishing a predetermined load on the rim frame in the closed position. As such, the eyewear assembly is effective for pinching onto a storage surface. The clasping features further include a pawl or detent located on the rim frame and a complementary detent or pawl located on the temple arm.

Accordingly, it is an object of the present invention to provide an eyewear assembly that may use integral features in existing component designs and requires few or no additional parts over conventional eyeglass designs to achieve the biasing feature described above.

It is another object to provide an eyewear assembly where at least one temple arm is biased tightly against a rim frame to pinch a storage surface placed therebetween, such that the eyewear clips tightly to the storage surface.

It is another object of the present invention to provide an eyewear assembly that is substantially similar in appearance to conventional eyeglass styles, as worn on the face of a wearer.

It is yet another object of the present invention to provide an eyewear assembly that is as easy to form and assemble as a conventional pair of eyeglasses.

It is a further object of the present invention to provide an eyewear assembly that clasps a temple arm and rim frame in an open or closed position.

These objects and other features, aspects, and advantages of this invention will be more apparent after a reading of the following detailed description, appended claims, and accompanying drawings.

BRIEF DESCRIPTION OF THE DRAWINGS

FIG. 18 is a top view of an end of the present invention illustrating a temple arm in the open position with a pawl fastened longitudinally thereto; and FIG. 19 is a top view of the hinge area of the FIG. 18 illustrating the temple arm in the open position, and the pawl registered in a detent in a shoulder portion.

DETAILED DESCRIPTION OF THE PREFERRED EMBODIMENT

In general, the present invention involves eyewear including a rim frame and a temple arm that is pivotably hinged to the rim frame. More specifically, the present invention involves an eyewear assembly where a temple arm and rim frame can be firmly clasped together to bias the temple arm tightly against the rim frame in a closed position for pinching a storage surface between the temple arm and rim frame. While the present invention may be described in detail with respect to a single temple arm that is biased against a rim frame, the present invention is also well suited to multiple temple arms that are capable of being biased against the rim frame—such that the present invention may be used in an ambidextrous manner.

As used herein, the term "bias" is intended to mean to urge, force, or load. For example, the temple arm is biased against the rim frame such that a separation force must be exerted to separate the temple arm from the rim frame when the temple arm is in the closed position. Further, the temple arm resiliently recovers the closed position—biased against the rim frame—upon release of the separation force. Thus, the temple arm is under a stored load in the closed position. Furthermore, the phrase "... temple arm biased against the rim frame ...", or any reasonably similar equivalent, is intended to encompass the temple arm directly biased against the rim frame or indirectly biased against the rim frame through another temple arm intermediate the rim frame and temple arm. In addition, the term "tightly" is intended to mean involving a bias force at least tight enough to pinch and maintain position on a storage surface under the weight of an eyewear assembly. Accordingly, the eyewear assembly—if turned upside down—would fall off the storage surface without the bias force. Finally, the term "clasp"

is used synonymously with embrace, grip, grasp, hold, or clutch and refers to a releasable mechanism for holding two or more objects together.

Figure 1:
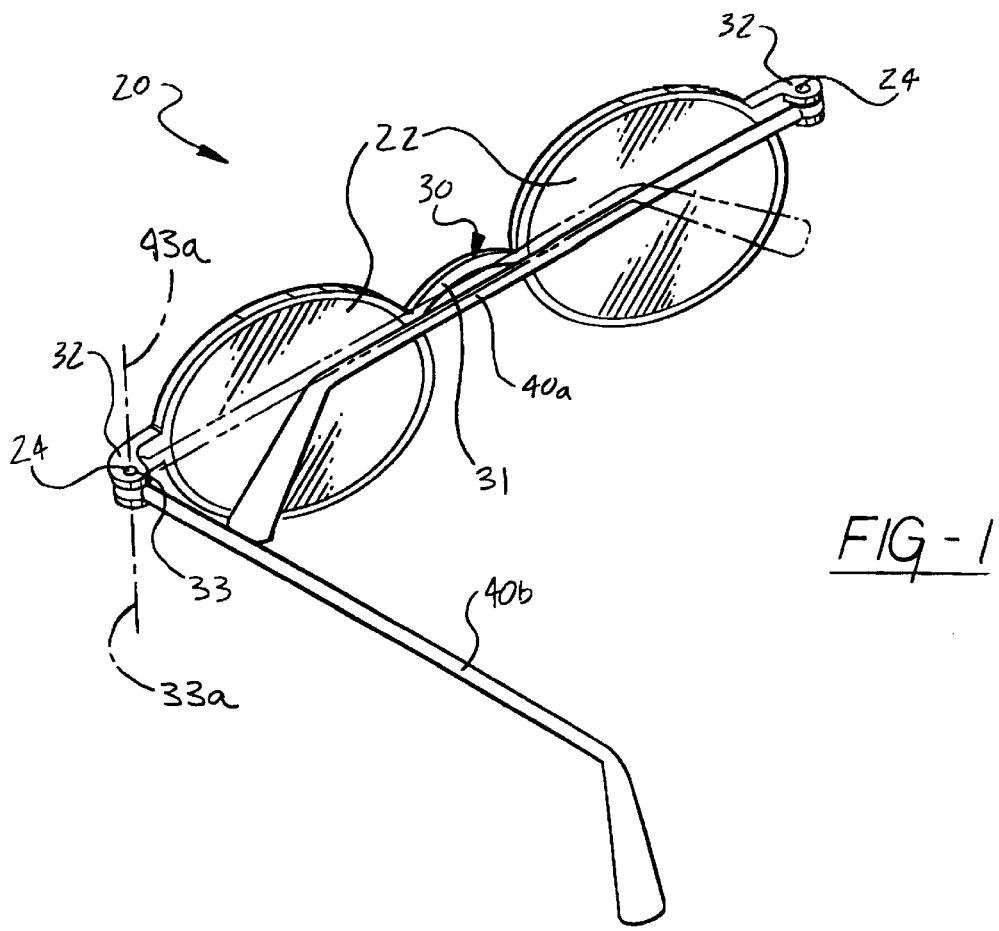
FIG. 1 is a perspective view of an eyewear assembly according to an embodiment of the present invention.

Referring now specifically to the Figures, FIG. 1 illustrates a perspective view of an eyewear assembly 20 having a rim frame 30 housing a pair of lenses 22. The rim frame 30 further is attached to a first temple arm 40a and a second temple arm 40b on opposite sides of the eyewear assembly 20 via a hinge pin 24 through an end on each of the first and second temple arms 40a and 40b. Each hinge pin 24 attaches the first and second temple arms 40a and 40b to the rim frame 30 in a pivotable manner. Each of the ends of the first and second temple arms 40a and 40b include a pivot axis 43a through which the hinge pin 24 mounts. Other structure for pivotably attaching the first and second temple arms 40a and 40b to the rim frame 30 may be used without departing from the intended scope of the present invention.

The rim frame 30 is preferably made from a metal frame composed of steel, spring steel, or aluminum, but may also be made from any other typical eyewear material such as plastic. The rim frame 30 extends laterally outward from a nosepiece 31 in opposite directions, terminating in a shoulder portion 32 on either side of the eyewear assembly 20. Each shoulder portion 32 is preferably integral with the rest of the rim frame 30 but may be welded or fastened thereto. Each shoulder portion 32 includes an aperture 33 therethrough that establishes a pivot axis 33a—about which is mounted one end of each of the first and second temple arms 40a and 40b, respectively. Accordingly, the hinge pin 24 extends through the aperture 33 and pivotably attaches each of the first and second temple arms 40a and 40b to the complementary shoulder portion 32, such that the pivot axes 33a and 43a are coaxially disposed.

The second temple arm 40b is shown in both an open position substantially perpendicular to the rim frame 30 for use by a wearer as shown in solid, and in a closed position substantially parallel with the rim frame 30 for storage, as shown in phantom line. In addition, the first temple arm 40a is shown in a closed position substantially parallel to the rim frame 30 and both the first and second temple arms 40a and 40b can be biased against the rim frame 30 for storage as discussed above. The first and second temple arms 40a and 40b are pivotable to and from the open and closed position. For example, the second temple arm 40b may be hung over a shirt pocket (not shown) and the eyewear assembly 20 then folded together so as to pinch the shirt pocket between the second and first temple arms 40b and 40a that are clasped in their respective closed positions. The second temple arm 40b is biased against the rim frame 30, to pinch the storage surface to which the eyewear is clipped. A wearer can accomplish this method of storage no matter what sequence the first and second temple arms 40a and 40b are folded closed. Preferably, the first and second temple arms 40a and 40b are made of the same material as the rim frame 30, but may be composed of a different material. Structural examples for biasing the first and second temple arms 40a and 40b tightly against the rim frame 30 in at least one pivotal position are discussed below.

Figure 2:
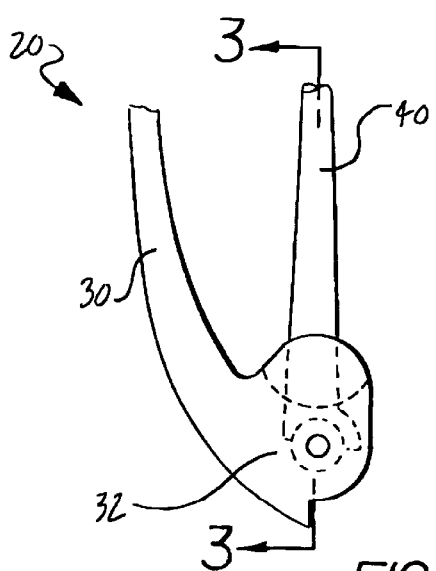
FIG. 2 is a top view of one end of an eyewear assembly of the present invention.
Figure 3:
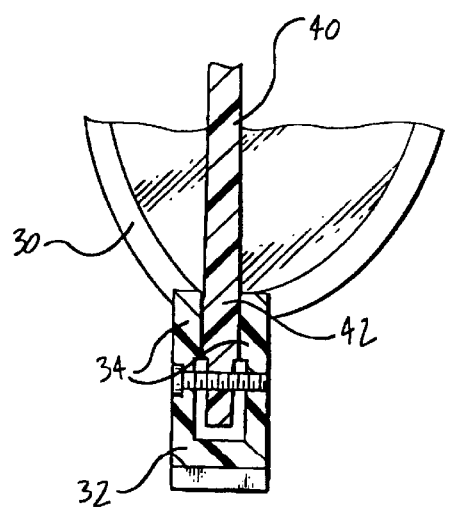
FIG. 3 is a cross-sectional view of the end of FIG. 2, taken along lines 3—3 illustrating an interference fit between a temple arm flange and a bifurcated flange.

FIG. 2 illustrates a top view of one end of the eyewear assembly 20 having the temple arm 40 pivotably mounted to the shoulder portion 32 of the rim frame 30. The temple arm 40 is shown in the closed position, and is biased against the rim frame 30. FIG. 3 shows a single flange portion 42 of the temple aim 40 clasped in the closed position between a bifurcated flange 34 extending from the shoulder portion 32 of the rim frame 30. Here the bifurcated flange 34 is resilient in nature and the thickness of the single flange portion 42 of the temple arm 40 is greater than the distance between the bifurcated flange 34 in its free state. As the temple arm 40 is swung from the open position to the closed position, the bifurcated flange 34 resiliently spreads open from its free state but frictionally clasps the temple arm 40. Thus, the bifurcated flange 34 clasps the temple arm 40 in place, biased against the rim frame 30.

Additionally, the bifurcated flange 34 may be sloped toward the rim frame 30 to further bias the temple member against the rim frame 30. As such, the single flange portion 42 and the bifurcated flange 34 act as a pawl and detent mechanism, where the pawl is the single flange portion 42 and the detent is the relatively tight space between the bifurcated flange 34. The bifurcated flange 34 clasps the single flange portion 42 tightly enough to keep the eyewear assembly 20 pinched tightly over a shirt pocket or other storage surface. The bifurcated flange 34 can be spread repeatedly during the life of the eyewear assembly 20 and tends to return to its original configuration due to the inherent elastic properties thereof. It is only preferred that the bifurcated flange 34 extend from the shoulder portion 32. Accordingly, the bifurcated flange 34 may be integral with and extend from the rim frame 30 itself.

The temple arm 40 may be pivoted back to the open position by pulling on the temple arm 40 toward the open position to release the temple arm 40 from the grip of the bifurcated flange 34. The force required to overcome the frictional engagement can be varied by design by modifying the surface texture of the interlocking flanges 34 and 42 or by varying the dimensions of the flanges 34 and 42 to increase or decrease the interference fit.

Figure 4:
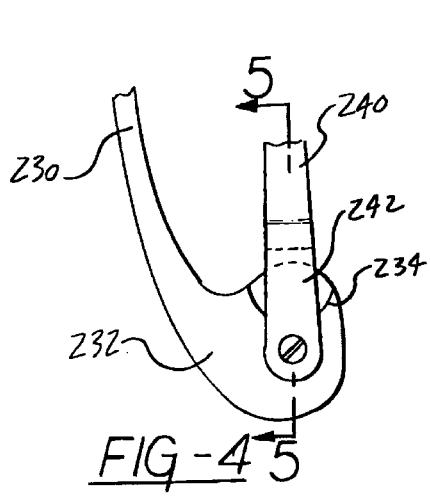
FIG. 4 is another top view of an alternate embodiment of an end of the present invention.
Figure 5:
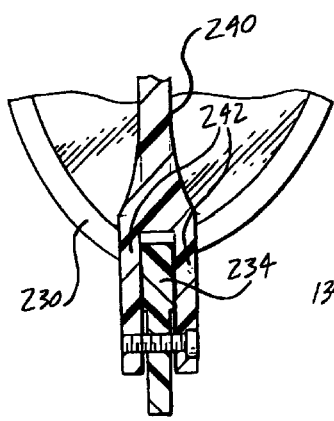
FIG. 5 is a cross-sectional view of the end of FIG. 4, taken along lines 5—5 illustrating an interference fit between a rim frame flange and temple arm bifurcated flange.

FIGS. 4 and 5 illustrate the same concept of FIGS. 2 and 3, except the flanges are reversed. Here a single flange portion 234 extends from a shoulder portion 232 of a rim frame 230 to reside within a bifurcated flange 242 that terminates a temple arm 240. Again, as the temple arm 240 is closed, the bifurcated flange 242 clasps the single flange portion 234 to clasp the temple arm 240 in the closed position, biased against the rim frame 230 as best depicted by FIG. 1. Again, the bifurcated flange 242 may be sloped toward the rim frame 230 to further bias the temple member against the rim frame 230.

Referring in general to all of the Figures, there are illustrated embodiments of the present invention with the temple arms clasped substantially parallel to the rim frame and biased against the rim frame. However it is contemplated with all of the embodiments that the temple arm may also be clasped in the open position. This could be accomplished by positioning a pawl and detent such that the pawl would be positioned to engage the detent while the temple arm is in the open position. Accordingly, referring specifically to FIGS. 2 through 5, the location of interference between the flanges may be positioned in an alternative manner to accomplish this objective.

Figure 6:
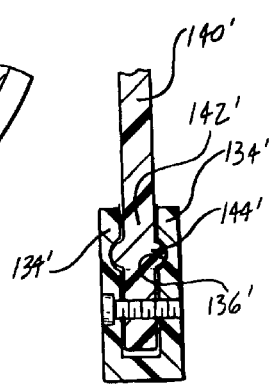
FIG. 6 is an alternative cross-sectional view of the end of FIG. 2 illustrating a temple arm pawl registered into a rim frame detent.
Figure 7:
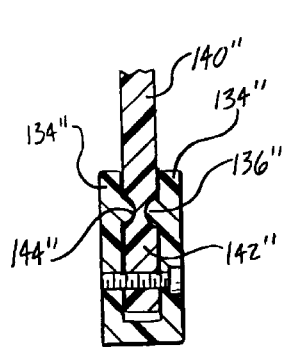
FIG. 7 is another alternative cross-sectional view of the end of FIG. 2 illustrating a rim frame pawl registered into a temple arm detent.
Figure 8:
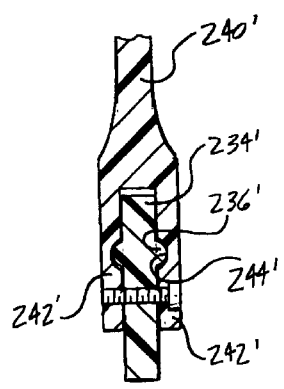
FIG. 8 is an alternative cross-sectional view of the end of FIG. 4 illustrating a rim frame pawl registered into a temple arm flange detent.

Referring now to FIGS. 6 through 8, there is illustrated a combination of the teachings of FIGS. 2 through 5 with integral "ball and socket" architecture to achieve a more positive clasping between the flanges. In FIG. 6 a temple arm 140' has a single flange portion 142' with a ball portion 144' that engages or registers into a socket 136' in a bifurcated flange 134' to clasp the temple arm 140' in the closed position and further to bias the temple arm 140' against the rim frame (not shown). The ball portion 144' need not be formed on both sides of the single flange portion 142', but may be formed on either side thereof. Further, the location of the ball portion 144' and socket 136' may be reversed. Accordingly, FIG. 7 illustrates the reverse configuration with a ball portion 136" on a bifurcated flange 134" interlocking with a socket 144" in a single flange portion 142" of a temple arm 140". Referring to FIGS. 6 and 7, the ball portions 144' and 136" are preferably in the form of a semi-sphere, but any other shape that functions as a detent feature would suffice. Similarly, the sockets 136' and 144" are preferably shaped complementarily to the ball portions 144' and 136", but may take any other suitable shape.

Figure 9:
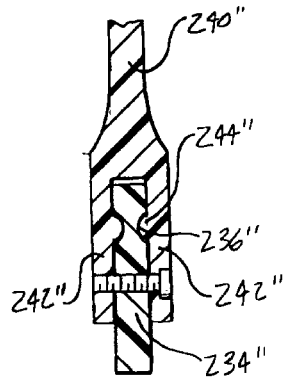
FIG. 9 is another alternative cross-sectional view of the end of FIG. 4 illustrating a temple arm pawl registered into a rim frame detent.

FIGS. 8 and 9 illustrate the principles of FIGS. 6 and 7 as applied to the reverse configuration of the flanges. In FIG. 8 a single flange portion 234' has a ball portion 236' that engages a socket 244' in a bifurcated flange 242' of a temple arm 240'. As with FIG. 7, the location of the ball portion 236' and socket 244' may be reversed. Accordingly, in FIG. 9 a single flange portion 234" has a socket 236" that engages a ball portion 244" on a bifurcated flange 242" of a temple arm 240".

Referring generally to FIGS. 6 through 9, the ball portion and socket are positioned on the temple arm and shoulder such that the temple arm is biased against the rim frame in the closed position when the ball portion registers into the socket. Accordingly, as with all of the embodiments of the present invention, the temple arm is necessarily in contact with the rim frame or another temple arm so that a storage surface may be pinched therebetween.

Figure 10:
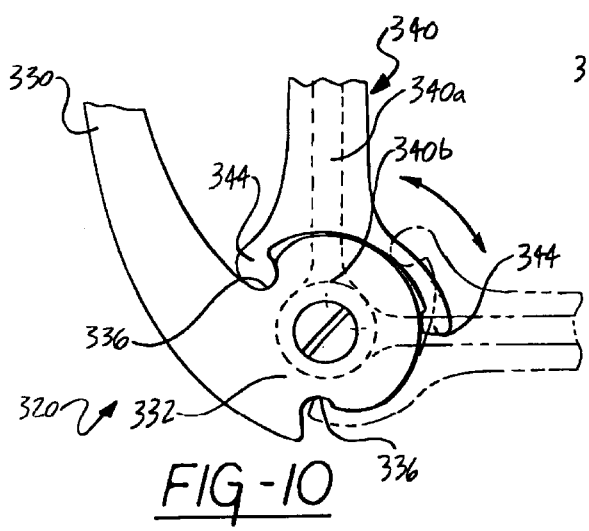
FIG. 10 is a top view of an end of the present invention illustrating a temple arm pawl registered into a rim frame detent.
Figure 11:
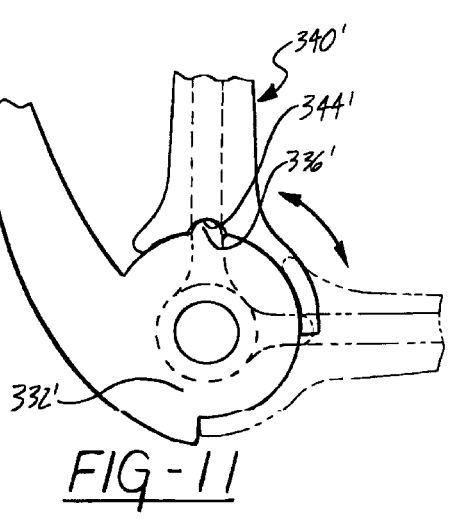
FIG. 11 is a top view of an end of the present invention illustrating a rim frame pawl registered into a temple arm detent.

FIG. 10 illustrates a rim frame 330 having a shoulder portion 332 at one end of an eyewear assembly 320 having at least one semi-spherical shaped detent 336 in a predetermined angular position in the shoulder portion 332. The detent 336 engages at least one semi-spherical shaped pawl 344 in a corresponding angular position at the end of a temple arm 340 so as to clasp the temple arm 340 with respect to the rim frame 330 and bias the temple arm 340 against the rim frame 330 in the closed position. Alternatively, the pawl 344 may be positioned to engage a detent 336 with the temple arm 340 in the open position. The pawl 344 is resilient and capable of repeated flexing out of and back into the detent 336 as the temple arm 340 is swung open and closed over the life of the eyewear assembly 320. Additionally, the temple arm 340 can be of spring collar construction similar to that of U.S. Pat. No. 5,739,891 to Wei. In that case, the temple arm 340 would have a collar 340a spring loaded along the longitudinal axis of the temple arm 340 about a clevis 340b. This would provide additional resiliency to enable the pawl 344 to register into the detent 336. Alternatively, FIG. 11 illustrates a pawl 336' integral with a shoulder portion 332' that interlocks into a detent 344' in the end of a temple arm 340'. Again, the pawl 336' and detent 344' are positioned strategically so that the temple arm 340' is biased against a rim frame 330' or another temple arm (not shown).

Figure 12:
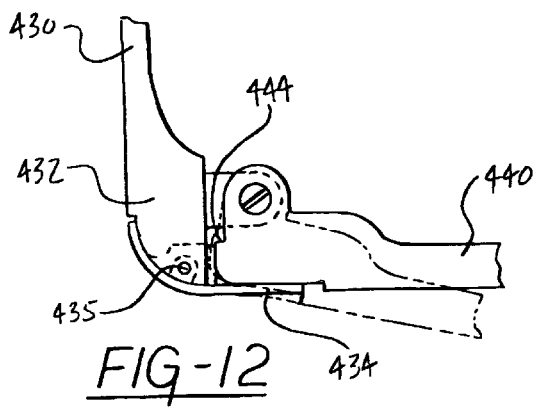
FIG. 12 is top view of an end of the present invention illustrating a temple arm in an open position with a flush mounted rim frame pawl.
Figure 13:
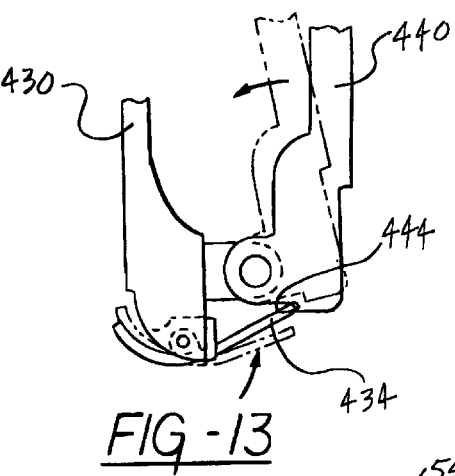
FIG. 13 is a top view of the hinge area of FIG. 12 illustrating the temple arm in a closed position with the rim frame pawl registered into the temple arm detent.

FIGS. 12 and 13 illustrate the preferred embodiment where a pawl 434 need not be integral with a rim frame 430 to work effectively. FIG. 12 shows a temple arm 440 in the open position with the pawl 434 pivotably mounted about a hinge pin 435 of a shoulder portion 432 of the rim frame 430. The pawl 434 is a stiff spring-like member and mounts flush to the temple arm 440 and rim frame 430 for aesthetic and functional considerations. The pawl 434 is preferably made from spring steel such that, in the open position, the pawl 434 engages the temple arm 440 to provide resistance against hyperextension of the temple arm 440, as shown in phantom.

The temple arm 440 also includes a detent 444 at the end thereof for accepting the pawl 434 when the temple arm 440 is in the closed position. FIG. 13 depicts the temple arm 440 swung to the closed position and clasped in the closed position by the pawl 434. Preferably, the temple arm 440 is compressed resiliently against the rim frame 430 (as shown in phantom), the pawl 434 is snapped or urged into the detent 444, and the temple arm released (as shown in solid). Accordingly, the pawl 434 registers in the detent 444 of the temple arm 440 to clasp the temple arm 440 in the closed position and bias the temple arm 440 against the rim frame 430. The temple arm 440 may be released from the closed position by again compressing the temple arm 440 resiliently against the rim frame 430 to disengage the pawl 434.

Figure 14:
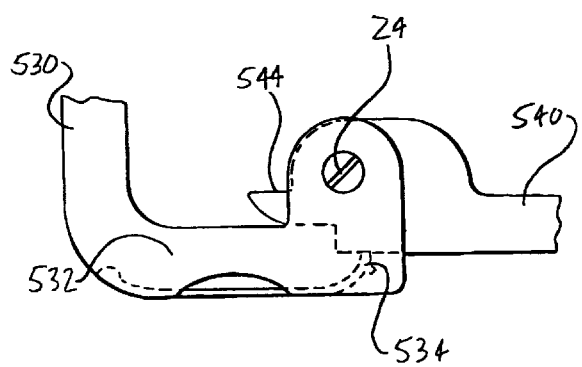
FIG. 14 is a top view of an end of the present invention illustrating a temple arm in an open position with a rim frame pawl mounted flush to the rim frame.
Figure 15:
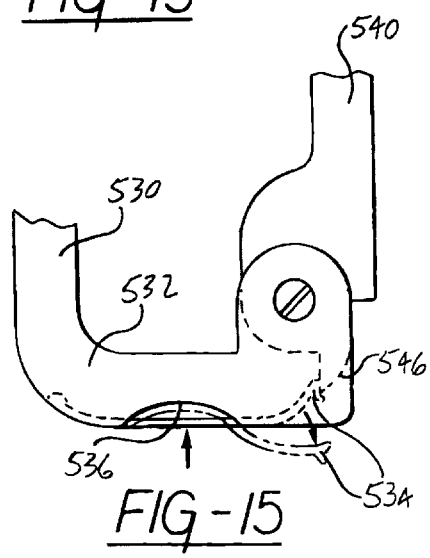
FIG. 15 is a top view of the hinge area of FIG. 14 illustrating the temple arm in a closed position with the rim frame pawl registered into the temple arm detent.
Figure 16:
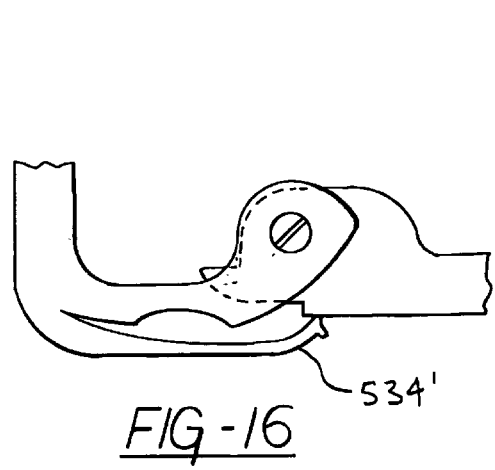
FIG. 16 is a top view of a hinge of the present invention illustrating a temple arm in an open position with an integral pawl.
Figure 17:
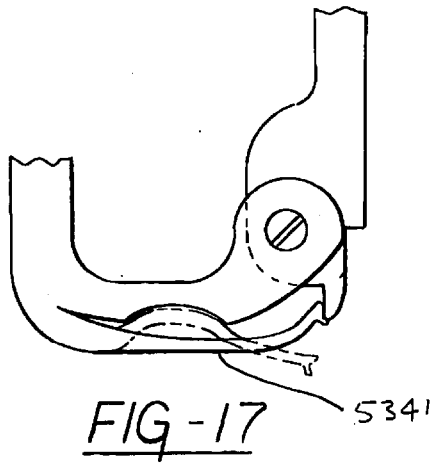
FIG. 17 is a top view of the hinge area of FIG. 16 illustrating the temple arm in a closed position with the integral pawl registered into the temple arm detent.

FIG. 14 illustrates a temple arm 540 in the open position and having a detent 544 in the end thereof. The temple arm 540 is pivotably mounted to a rim frame 530 by the hinge pin 24. The rim frame 530 has a shoulder portion 532 extending therefrom and a pawl 534 integrally fastened thereto that engages the detent 544. FIG. 15 illustrates the temple arm 540 swung to the closed position. Here, as the temple arm 540 is swung closed, a rounded portion 546 sweeps the pawl 534 out of the way of the temple arm 540 until the temple arm 540 becomes substantially parallel with the rim frame 530. Then, the pawl 534 snaps into place as shown, thereby clasping the temple arm 540 in place biased against the rim frame 530. The pawl 534 registers between the shoulder portion 532 and temple arm 540 to prevent the temple arm 540 from swinging open. In addition, the pawl 534 acts to bias the temple arm 540 against the rim frame 530. The temple arm 540 may be released by pressing on the middle of the pawl 534 thereby conforming the pawl 534 to a recess 536 in the shoulder portion 532 of the rim frame 530, and consequently swinging the pawl 534 clear of the detent 544. Finally, it is contemplated that the pawl 534 could be made integral with the rim frame 530 to achieve the same interlocking configuration. Accordingly, FIGS. 16 and 17 illustrate an integral pawl 534' version of FIGS. 14 and 15, where the pawl 534' is an integral spring-like projection.

FIGS. 18 and 19 illustrate another embodiment of the present invention where a pawl 644 registers into a detent 634 to clasp a temple arm 640 in place biased against a rim frame 630. The temple arm 640 includes the pawl 644 attached longitudinally thereto by a fastener 648 such as a screw, rivet, or the like near one end of the pawl 644. The other end of the pawl 644 is free to flex. The temple arm 640 is mounted to a shoulder portion 632 of the rim frame 630 via the hinge pin 24.

In the open position (as depicted by FIG. 18), the pawl 644 rests flat against the temple arm 640 and the shoulder portion 632. As the temple arm 640 is swung from the open position to the closed position, the pawl 644 traverses a tip 635 on the shoulder portion 632 to load the pawl 644, and spread it away from the temple arm 640. Consequently, the pawl 644 in turn biases the temple arm 640 against the rim frame 630. The pawl 644 then registers into the detent 634 to retain the temple arm 640 in the closed position. Additionally, the load on the pawl 644 acts to clasp the temple arm 640 in the closed position substantially parallel to the rim frame 630 as shown in FIG. 19. The temple arm 640 may be opened back up by pulling the temple arm 640 toward the open position so that the end of the pawl 644 overcomes the detent 634, rides back over the tip 635, and snaps back in place along the shoulder portion 632 in the open position. The load on the pawl 644 may be modified by adjusting the location of the fastener 648, increasing the spring rate of the pawl 644 used, or by increasing the moment arm defined by the distance between the centerline of the hinge pin 24 and the tip 635.

Referring now in general to all of the Figures, each embodiment illustrates a temple arm clasped in a closed position with respect to a rim frame and biased against the rim frame to create a pinching effect between the temple arm and the rim frame. Also contemplated, the pawl and detent may be positioned to clasp the temple arm and rim frame in an open position. Finally, the pawl and detent structure must be located proximate the pivot axes in such a manner as to permit the eyewear assembly to be pinched over an edge of a pocket, for example, such that the edge of the pocket locates proximate the pivot axes. This will ensure that a substantial amount of the storage surface actually gets pinched between the temple arm and the rim frame.

From the above it can be seen that a significant advantage of the present invention is that the eyewear assembly is capable of being clipped tightly to a storage surface for storage purposes. The prior art includes structure to permit a pair of eyeglasses to simply hang over a storage surface such as a pocket. The present invention, however, includes novel structure including a pawl on either the temple member or rim frame and a detent opposite the pawl where the pawl registers into the detent to bias the temple member against the rim frame for actually pinching a storage surface tightly therebetween.

An additional advantage of the present invention is that few or no additional parts are required over a typical pair of eyeglasses. At most, a separate pawl and hinge pin are required. At least, extra parts are not required because all of the necessary function is achieved with integral features. Consequently, the design is aesthetically similar to conventional eyeglass styles, and the eyewear is as easy to form and assemble as conventional eyeglasses.

Finally, the prior art is laden with references directed to providing eyewear that is spring loaded in the open position to fit the eyewear snugly to a wearer's head. There are fewer prior art references that are directed to eyewear locked in the closed position for compact storage, and there is apparently only one reference directed to eyewear with internal structure to enable the eyewear to be hung over a storage surface such as a pocket. In addition, there are many references in the prior art describing devices external to the eyewear, such as clips or special cases for clipping the eyewear to a storage surface. Accordingly, the present invention is an original design for providing eyewear that pinches tightly to a storage surface for reliable safekeeping.

While the present invention has been described in terms of a preferred embodiment, it is apparent that other forms could be adopted by one skilled in the art. For example, it makes no difference if only one or both sides of the eyewear are equipped with the pawl and detent structure. The pawl or detent may also be welded to the rim frame or temple arm instead of hinged or integrally attached. The pawl and detent structure need not be located on the shoulder portion specifically. For example, a detent could be located on a portion of the rim frame instead. Multiple pawls and/or detents may be provided to clasp the temple arm with respect to the rim frame in multiple angular positions. Additionally, it is contemplated that additional integral features such as knurling surface texture could be incorporated into the temple arm or rim frame to improve the pinching grip of the present invention. Alternatively, springs could be incorporated for automatically urging a pawl into or out of engagement with a detent. Accordingly, the scope of the present invention is to be limited only by the following claims.

What is claimed is:

1. An eyewear assembly, comprising:
   a rim frame including a shoulder portion having at least one pivot axis therethrough;
   at least one temple arm including one end mounted about said at least one pivot axis of said rim frame; and
   means for biasing said at least one temple arm against said rim frame in a closed position, said means for biasing being located between said shoulder portion of said rim frame and said one end of said at least one temple arm, such that said rim frame engages said at least one temple arm to bias said at least one temple arm closed against said rim frame when said at least one temple arm is in said closed position, whereby said temple arm establishes a predetermined load on said rim frame for pinching an item therebetween.

2. The eyewear assembly as claimed in claim 1, further comprising means for clasping said at least one temple arm in an open position with respect to said rim frame, wherein said means for clasping and said means for biasing further comprise:
   at least one clasping feature located on said rim frame; and
   at least one clasping feature located on said at least one temple arm, one of said at least one clasping features of said rim frame and said at least one temple arm comprising a detent, and another one of said at least one clasping features of said rim frame and said at least one temple arm comprising a pawl that engages said detent.

3. The eyewear assembly of claim 2, wherein said detent comprises a bifurcated flange, and said pawl comprises a single flange portion disposed between said bifurcated flange, such that said at least one temple arm and said rim frame clasp together.

4. The eyewear assembly of claim 3, wherein said bifurcated flange comprises a socket therein and said single flange portion comprises a ball portion thereon that engages said socket.

5. The eyewear assembly of claim 3, wherein said single flange portion comprises a socket therein and said bifurcated flange comprises a ball portion thereon that engages said socket.

6. The eyewear assembly of claim 2, wherein said pawl is integral with said at least one temple arm and said detent is integral with said rim frame.

7. The eyewear assembly of claim 6, wherein said pawl has a semi-spherical shape and said detent has a complementary semi-spherical shape.

8. The eyewear assembly of claim 2, wherein said pawl is integral with said rim frame and said detent is integral with said at least one temple arm.

9. The eyewear assembly of claim 8, wherein said pawl has a semi-spherical shape and said detent has a complementary semi-spherical shape.

10. The eyewear assembly of claim 2, wherein said pawl is pivotably attached to said rim frame and said detent is integral with said at least one temple arm, such that said pawl engages said detent to clasp said at least one temple arm relative to said rim frame.

11. The eyewear assembly of claim 10, wherein said pawl comprises a stiff spring-like member and further wherein said eyewear assembly further comprises a hinge pin, said pawl being mounted to said rim frame by said hinge pin, whereby said pawl is manually urged into engagement with said detent when said at least one temple arm is in said closed position.

12. The eyewear assembly of claim 11, wherein said at least one temple arm hyperextends beyond said open position when said pawl remains in contact with said at least one temple arm to bias said at least one temple arm back toward said open position.

13. The eyewear assembly of claim 10, wherein said pawl is integrally fastened to said rim frame, said pawl automatically engaging said detent when said at least one temple arm is swung to said closed position.

14. The eyewear assembly of claim 13, wherein said at least one temple arm hyperextends beyond said open position where said pawl remains in contact with said at least one temple arm to bias said at least one temple arm back toward said open position.

15. The eyewear assembly of claim 10, wherein said pawl comprises an integral spring-like projection integral with said rim frame.

16. The eyewear assembly of claim 15, wherein said at least one temple arm hyperextends beyond said open position where said pawl remains in contact with said at least one temple arm to bias said at least one temple arm back toward said open position.

17. The eyewear assembly of claim 2, wherein said pawl is fixedly mounted longitudinally along said at least one temple arm at one end thereof.

18. The eyewear assembly of claim 17, wherein said pawl is engaged in said detent on said rim frame in said closed position and further wherein said pawl is spaced a predetermined distance apart from said at least one temple arm and is thereby loaded to bias said at least one temple arm tightly against said rim frame.

19. An eyewear assembly, comprising:
a rim frame including a shoulder portion comprising at least one pawl thereon;
a temple arm having one end pivotably hinged to said shoulder portion of said rim frame; and
means for biasing said temple arm against said rim frame in a closed position, said means for biasing located between said shoulder portion of said rim frame and said one end of said temple arm;
said one end of said temple arm comprising a detent therein, said at least one pawl of said rim frame engaging said detent of said temple arm in said closed position, wherein said temple arm biases against said rim frame in said closed position, whereby said eyewear assembly is effective for pinching onto a storage surface;
said at least one pawl further engaging said detent when said temple arm is in an open position with respect to said rim frame.

20. An eyewear assembly, comprising:
a rim frame including a shoulder portion comprising at least one detent therein;
a temple arm having one end pivotably hinged to said shoulder portion of said rim frame; and
means for biasing said temple arm against said rim frame in a closed position, said means for biasing located between said shoulder portion of said rim frame and said one end of said temple arm;
said one end of said temple arm comprising a pawl thereon, said pawl engaging said at least one detent of said rim frame in said closed position, such that said temple arm biases against said rim frame in said closed position, whereby said eyewear assembly is effective for pinching onto a storage surface;
said pawl further engaging said at least one detent when said temple arm is in an open position with respect to said rim frame.

21. An eyewear assembly, comprising:
a rim frame including a shoulder portion having at least one pivot axis therethrough;
at least one temple arm including one end mounted about said at least one pivot axis of said rim frame; and
means for biasing said at least one temple arm against said rim frame through another temple arm of said at least one temple arm in a closed position, said means for biasing being located between said shoulder portion of said rim frame and said one end of said at least one temple arm, such that said rim frame engages said at least one temple arm to bias said at least one temple arm closed against said another of said at least one temple arm when said at least one temple arm is in said closed position, whereby said temple arm establishes a predetermined load on said rim frame for pinching an item therebetween.

* * * * *